(12) United States Patent
Chen et al.

(10) Patent No.: US 10,698,542 B2
(45) Date of Patent: Jun. 30, 2020

(54) CAPACITIVE TOUCH PANEL HAVING PARTITIONED REGIONS FOR DRIVE LINES AND SENSE LINES ON SURFACE THEREOF

(71) Applicant: Quanzhou Shengwei Electronic Technology Co., Ltd., Quanzhou (CN)

(72) Inventors: Zuhui Chen, Quanzhou (CN); Xiaogang Zhao, Quanzhou (CN); Hongtao Tian, Quanzhou (CN); Ping Huang, Quanzhou (CN); Li Wu, Quanzhou (CN); Lichao Huang, Quanzhou (CN); Jian Cai, Quanzhou (CN); Shangmeng Li, Quanzhou (CN)

(73) Assignee: QUANZHOU SHENGWEI ELECTRONIC TECHNOLOGY CO., LTD., Quanzhou, Fujian (CN)

( * ) Notice: Subject to any disclaimer, the term of this patent is extended or adjusted under 35 U.S.C. 154(b) by 0 days.

(21) Appl. No.: 16/166,093

(22) Filed: Oct. 20, 2018

(65) Prior Publication Data
US 2019/0235662 A1    Aug. 1, 2019

(30) Foreign Application Priority Data

Jan. 26, 2018   (CN) .......................... 2018 1 0077506

(51) Int. Cl.
*G06F 3/044* (2006.01)
(52) U.S. Cl.
CPC ............ *G06F 3/044* (2013.01); *G06F 3/0445* (2019.05); *G06F 3/0446* (2019.05); *G06F 3/0448* (2019.05); *G06F 2203/04111* (2013.01)

(58) Field of Classification Search
None
See application file for complete search history.

(56) References Cited

U.S. PATENT DOCUMENTS

| 5,534,892 | A | * | 7/1996 | Tagawa | ................ | G06F 3/0412 178/20.01 |
| 2013/0135247 | A1 | * | 5/2013 | Na | .......................... | G06F 21/32 345/174 |
| 2017/0336909 | A1 | * | 11/2017 | Song | ..................... | G06F 3/0416 |

FOREIGN PATENT DOCUMENTS

CN          107797708 A       3/2018

\* cited by examiner

*Primary Examiner* — Ifedayo B Iluyomade
(74) *Attorney, Agent, or Firm* — Dragon Sun Law Firm, PC; Jinggao Li, Esq.

(57) ABSTRACT

The present disclosure discloses a capacitive touch panel having two surfaces, each surface at least including a region with drive lines formed therein and a region with sense lines formed therein, wherein the regions on the two surfaces correspondingly coincide in a direction perpendicular to the surfaces. The multiple drive lines extend along a first direction, while the multiple sense lines extend along a second direction perpendicular to the first direction. An end of each drive line on the periphery of the substrate is connected to a drive chip, with the other end thereof left floating; an end of each sense line on the periphery of the substrate is connected to a sense chip, with the other end thereof left floating. The present disclosure substantially shortens the length of the drive/sense lines and the resistance.

20 Claims, 9 Drawing Sheets

Prior Art

Fig. 1

Prior Art

CAPACITIVE TOUCH PANEL HAVING PARTITIONED REGIONS FOR DRIVE LINES AND SENSE LINES ON SURFACE THEREOF

CROSS REFERENCE TO RELATED APPLICATION

This application is based upon and claims priority to Chinese Patent Application No. 201810077506.0, filed on Jan. 26, 2018, the entire content of which is incorporated herein by reference.

TECHNICAL FIELD

The present disclosure relates to a capacitive touch panel, and in particular to a capacitive touch panel having partitioned regions for drive lines and sense lines on a surface of the capacitive touch panel.

BACKGROUND

A touch screen, the most simple, convenient and natural means for man-machine interaction, is widely employed in information search, industrial control, self-service, multimedia teaching, electronic games, and so on. Among all the touch screens, a capacitive touch screen plays an important role due to its accuracy, wearability, and longevity, and has a better application prospect. Generally, a capacitive screen includes a touch panel and a display device, both of which being connected via adhesive components (such as adhesive tapes or adhesive agents) on the periphery, with the touch panel providing touch and control functionality, while the display device providing display functionality. The periphery (edges) region for connecting the touch panel and the display device is a black matrix region (i.e., a non-visible region) of the capacitive screen, wherein the periphery (edges) region of the touch panel is a non-active region.

Figure 1:
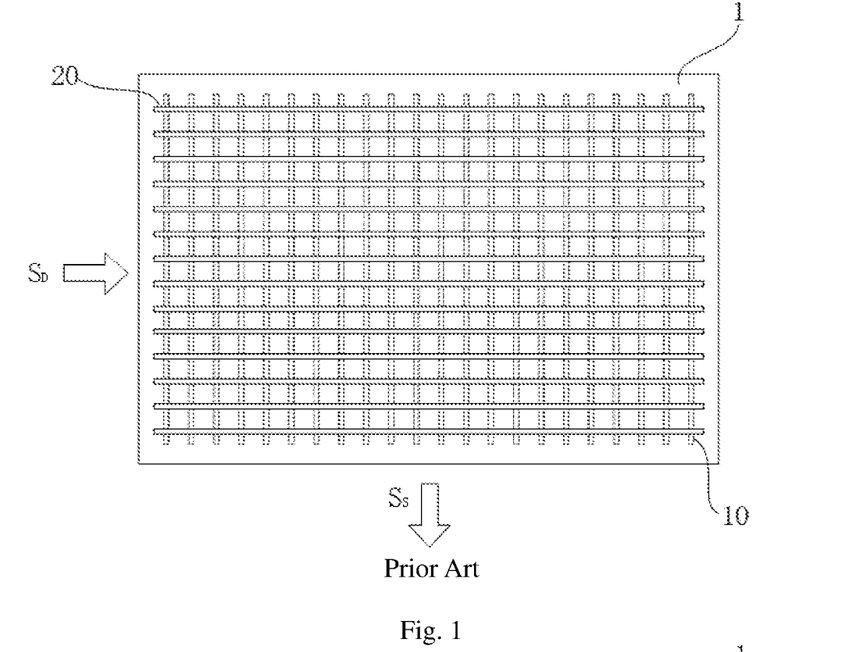
FIG. 1 is a schematic diagram of a capacitive touch panel based on mutual capacitance concept of the prior art.

A touch screen may be single faceted or double faceted, with the latter only being the subject of the present disclosure. A touch panel based on mutual capacitance concept of the prior art is shown in FIG. 1, there are multiple rows of sequentially arranged drive lines, e.g., the drive line 20, on a surface (the front surface of FIG. 1, orientated towards the outside of the drawing sheet) of a substrate of the touch panel 1, and there are multiple columns of sense lines, e.g., the sense line 10, on the other surface (the back surface of FIG. 1, orientated towards the inside of the drawing sheet, with components on the back surface delineated with dashed lines). The multiple drive lines extend along the horizontal direction depicted in FIG. 1, on the front surface of the substrate of the touch panel 1, from the left edge of the front surface to the right edge of the front surface. The ends of the multiple drive lines are electrically connected to a drive chip (not shown) at the left edge of the front surface, while the other ends of the multiple drive lines at the right edge of the front surface left floating. The multiple sense lines extend along the vertical direction depicted in FIG. 1, on the back surface of the substrate of the touch panel 1, from the lower edge of the surface to the upper edge of the back surface. The ends of the multiple sense lines are electrically connected to a sense chip (not shown) at the lower edge of the back surface, while the other ends of the multiple sense lines at the upper edge of the back surface left floating. Thus, the drive lines and the sense lines on the two sides of the substrate intersect virtually to form a lattice structure. In actual usage, the drive chip sends a drive signal $S_D$ to the drive lines, for example by sending the drive signal $S_D$ to the drive lines in a sequentially scanning manner from top to bottom; while the sense chip receives one or more sense signals $S_S$ from the sense lines, for example by detecting the sense lines to receive one or more sense signals output therefrom. Hence, by analyzing the drive signal $S_D$ and the sense signal $S_S$, it is easy to determine whether the surface of the touch panel is touched, as well as the position of the touch together with the related action, thereby obtaining the manipulation information inputted by the user via the touch panel.

With development of touch screen technology, users demand for larger screen and higher touch control precision, which poses a challenge to prior art techniques. A touch screen with larger size requires longer drive/sense lines, while higher touch control precision requires finer drive/sense lines, which results in bigger resistance of the drive/sense lines and difficulty in detection of the sense signal $S_S$.

Figure 2:
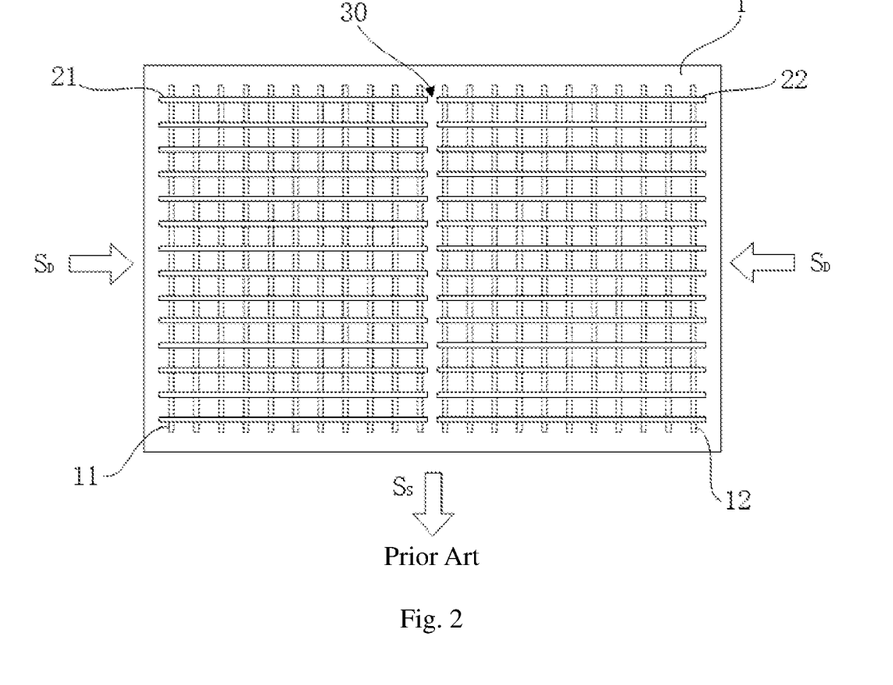
FIG. 2 is a schematic diagram of another capacitive touch panel based on mutual capacitance concept of the prior art.

In face of the above problem, the inventors provide a solution in the Chinese patent "A capacitive touch screen with fewer peripheral circuits," with the application number 201711157482.1. As shown in FIG. 2, drive lines on a front surface of a substrate of a touch panel 1 are divided into two groups, with those of the first group disposed on the left half of the surface, e.g., the drive line 21, while those of the second group disposed on the right half of the surface, e.g., the drive line 22. Each corresponding drive line in the two groups aligns with one another along the horizontal direction depicted in FIG. 2, and a gap 30 is formed between the first group and the second group. Wherein, an end of each drive line of the first group is connected to a drive chip at the left edge of the surface, while the other end (at the central axial line of the surface) of each drive line left floating. An end of each drive line of the second group is connected to the drive chip at the right edge of the surface, while the other end (at the central axial line of the surface) of each drive line left floating. Multiple sense lines are arranged on the back surface of the substrate similar to those in FIG. 1, e.g. sense lines 11 and 12. In actual usage, the drive chip sends a drive signal $S_D$ to the drive lines in the first and second groups, for example in a sequentially scanning manner from top to bottom, by sending the drive signal $S_D$ simultaneously to the drive lines 21 and 22 and subsequently to the two drive lines beneath the drive lines 21 and 22 respectively. The sense chip receives one or more sense signals $S_S$ from the sense lines, for example by detecting the sense lines simultaneously. Thus, it can be seen that in comparison with the prior art described in FIG. 1, the drive lines in FIG. 2 are shorter, resulting in decreased resistance. Therefore, even if the solution is applied in a larger size touch screen, or the width of the drive lines is decreased, detection precision for the sense signal $S_S$ would not be impacted by the increased resistance.

However, for the aligned pair of drive lines (for example the drive lines 21 and 22) as described in the technical solution of FIG. 2, mutual signal interferences inevitably exist at opposing ends of the aligned pair, which impacts on detection precision for the sense signal $S_S$.

Therefore, a person skilled in the art endeavors to develop a capacitive touch panel, to solve the aforementioned technical problem.

SUMMARY OF THE INVENTION

To realize the aforementioned object, the present disclosure provides a capacitive touch panel including a substrate, wherein a first surface of the substrate includes a first region and a second region, and a second surface of the substrate includes a third region and a fourth region, with the first region and the fourth region, the second region and the third region coinciding respectively in a direction perpendicular to the first surface and the second surface respectively.

In some embodiments, a first group of first conducting lines is formed in the first region, a first group of second conducting lines is formed in the second region, a second group of the first conducting lines is formed in the third region, and a second group of the second conducting lines is formed in the fourth region.

In some embodiments, each of the first conducting lines of the first group and the second group extends along a first direction from the edge of the substrate to the middle thereof, with an end of said each first conducting line on the edge being connected to a first chip, and an end of said each first conducting line in the middle left floating.

In some embodiments, each of the second conducting lines of the first group and the second group extends along a second direction from the edge of the substrate to the middle thereof, with an end of said each second conducting line on the edge being connected to a second chip, and an end of said each second conducting line in the middle left floating.

Wherein, the first conducting line is a drive line or a sense line, the second conducting line is a drive line or a sense line, the first chip is a drive chip or a sense chip, and the second chip is a drive chip or a sense chip.

In some embodiments, the first direction is perpendicular to the second direction.

In some embodiments, the touch panel is a rectangular, wherein the first direction and the second direction are respectively the extension directions of two adjacent sides of the touch panel.

In some embodiments, the first region and the second region are respectively disposed on the left half and the right half of the first surface.

In some embodiments, the first region and the second region have the same or different sizes.

In some embodiments, the first region and the second region have the same size and shape.

In some embodiments, the shape is rectangular, triangular, trapezoid, or irregular.

In some embodiments, the first surface further includes a fifth region, and the second surface further includes a sixth region, wherein the fifth region and the sixth region coincide in a direction perpendicular to the first surface and the second surface.

In some embodiments, a third group of the first conducting lines is formed in the fifth region, a third group of the second conducting lines is formed in the sixth region.

In some embodiments, each of the first conducting lines of the third group extends along the first direction from the edge of the substrate to the middle thereof, with an end of said each first conducting line on the edge being connected to the first chip, and an end of said each first conducting line in the middle left floating.

In some embodiments, each of the second conducting lines of the third group extends along the second direction from the edge of the substrate to the middle thereof, with an end of said each second conducting line on the edge being connected to the second chip, and an end of said each second conducting line in the middle left floating.

In some embodiments, the capacitive touch panel includes three first chips and three second chips, with the first conducting lines of the first, second, and third groups being respectively connected with one of the corresponding three first chips, and the second conducting lines of the first, second, and third groups being respectively connected with one of the corresponding three second chips.

In some embodiments, the touch panel is a rectangular, wherein the first direction and the second direction are respectively the extension directions of two adjacent sides of the touch panel.

In some embodiments, the first region is disposed on the left half of the first surface, the second region is disposed on the upper right half of the first surface, and the fifth region is disposed on the lower right half of the first surface;

In some embodiments, the first region is disposed on the upper left half of the first surface, the second region is disposed on the lower left half of the first surface, and the fifth region is disposed on the right half of the first surface.

In some embodiments, the first surface of the substrate further includes the fifth region and the sixth region, the second surface of the substrate further includes a seventh region and an eighth region, wherein the fifth region and the sixth region, the seventh region and the eighth region respectively coincide in a direction perpendicular to the first surface and the second surface.

In some embodiments, the third group of the first conducting lines is formed in the fifth region, the third group of the second conducting lines is formed in the sixth region, a fourth group of first conducting lines is formed in the seventh region, and a fourth group of the second conducting lines is formed in the eighth region.

In some embodiments, each of the first conducting lines of the third group and the fourth group extends along the first direction from the edge of the substrate to the middle thereof, with the end of said each first conducting line on the edge being connected to the first chip, and the end of said each first conducting line in the middle left floating;

In some embodiments, each of the second conducting lines of the third group and the fourth group extends along the second direction from the edge of the substrate to the middle thereof, with the end of said each second conducting line on the edge being connected to the second chip, and the end of said each second conducting line in the middle left floating.

In some embodiments, the capacitive touch panel includes four first chips and four second chips, with the first conducting lines of the first, second, third, and fourth groups being respectively connected with one of the four first chips, and the second conducting lines of the first, second, third, and fourth groups being respectively connected with one of the four second chips.

In some embodiments, the touch panel is a rectangular, wherein the first direction and the second direction are respectively the extension directions of the two adjacent sides of the touch panel.

In some embodiments, the first region is disposed on the upper left half of the first surface, the second region is disposed on the upper right half of the first surface, the fifth region is disposed on the lower right half of the first surface, and the sixth region is disposed on the lower left half of the first surface.

In some embodiments, in-between the numerous regions of the first surface and/or the second surface are arranged ground wires, which are not connected with any of the first conducting lines or the second conducting lines.

In some embodiments, the number of ground wires on any of the first surface or the second surface is one or multiple, with each of the one or multiple ground wires having at least an end thereof extended to the edge of the capacitive panel for grounding.

In some embodiments, the first conducting lines, the second conducting lines and the ground wires on any of the first surface or the second surface are made of a same material.

In some embodiments, the material is ITO.

In some embodiments, the first conducting lines, the second conducting lines and the ground wires on any of the first surface or the second surface are formed in a same process.

In some embodiments, an additional conducting line is provided in at least one region on the first surface and the second surface of the capacitive touch panel, wherein the additional conducting line is provided on periphery of the at least one region, and is adjacent to a floating end of each of a group of conducting lines, and the additional conducting line has an end on the periphery of the substrate.

If the group of conducting lines is the first group of the first conducting lines, the additional conducting line is the second conducting line, and the end of the additional conducting line, on the periphery of the substrate, is configured to be electrically connected to the second chip.

If the group of conducting lines is the second group of the second conducting lines, the additional conducting line is the first conducting line, and the end of the additional conducting line, on the periphery of the substrate, is configured to be electrically connected to the first chip.

In some embodiments, the additional conducting line has the end on the periphery of the substrate and the other end not on the periphery of the substrate, and the other end is left floating.

In some embodiments, the additional conducting line has a plurality of bent parts, each bent part corresponds to each floating end of the group of conducting lines in the at least one region respectively, and each bend part at least partly surrounds a floating end of the corresponding conducting line.

It can thus be seen that the present disclosure substantially shortens the length of the drive/sense lines and the resistance thereof by partitioning the two surfaces of the capacitive touch panel into numerous regions for the drive/sense lines with the need only to extending the length or height of the region therein, without extending the whole length or height of the capacitive panel itself. Moreover, at least part of the drive lines or sense lines can be made to be non-contiguous, and ground wires can be further disposed in-between the drive lines and the sense lines to substantially decrease signal interferences between the drive lines and the sense lines, thus increasing touch control precision for the capacitive touch panel.

In combination with the drawings hereunder provided, the design, specific structure and the resulting technical effect of the present disclosure will be further expounded to fully explain the objective, characteristics and effect thereof.

DETAILED DESCRIPTION OF THE INVENTION

Figure 3:
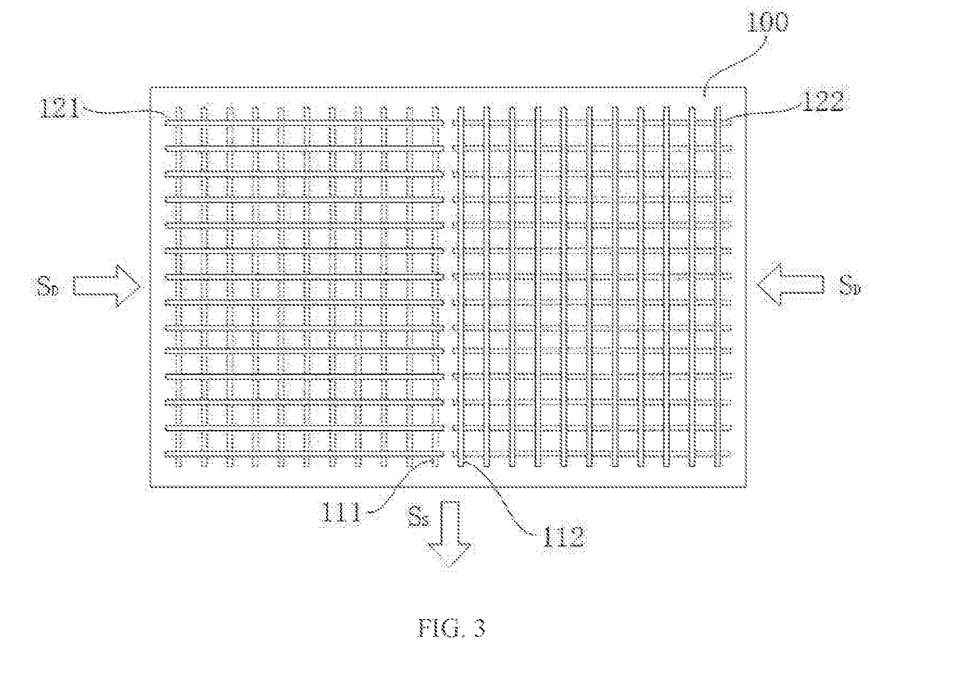
FIG. 3 is a schematic diagram of the capacitive touch panel of a first embodiment of the present disclosure.
Figure 4:
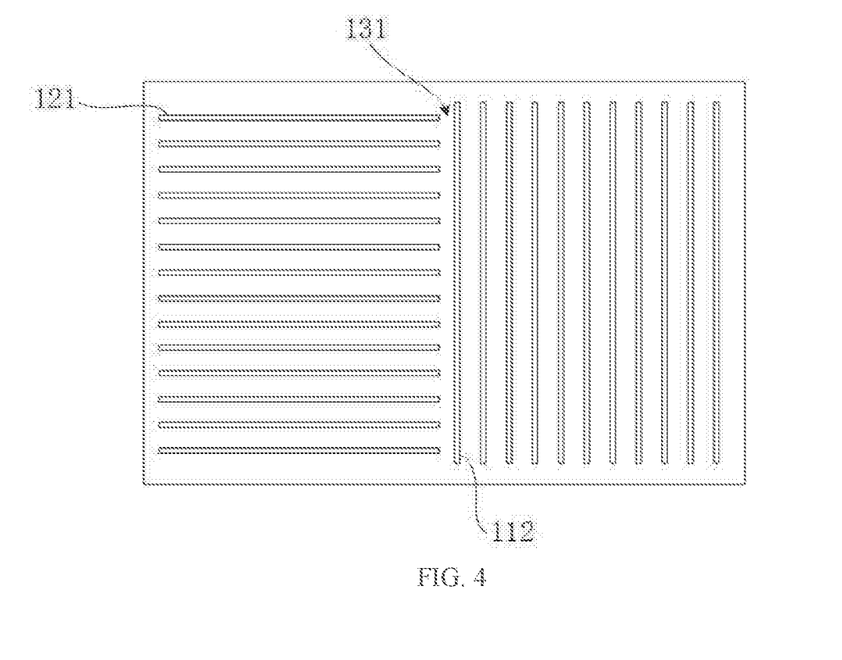
FIGS. 4 and 5 respectively shows each of the two surfaces of the capacitive touch panel in FIG. 3.
Figure 5:
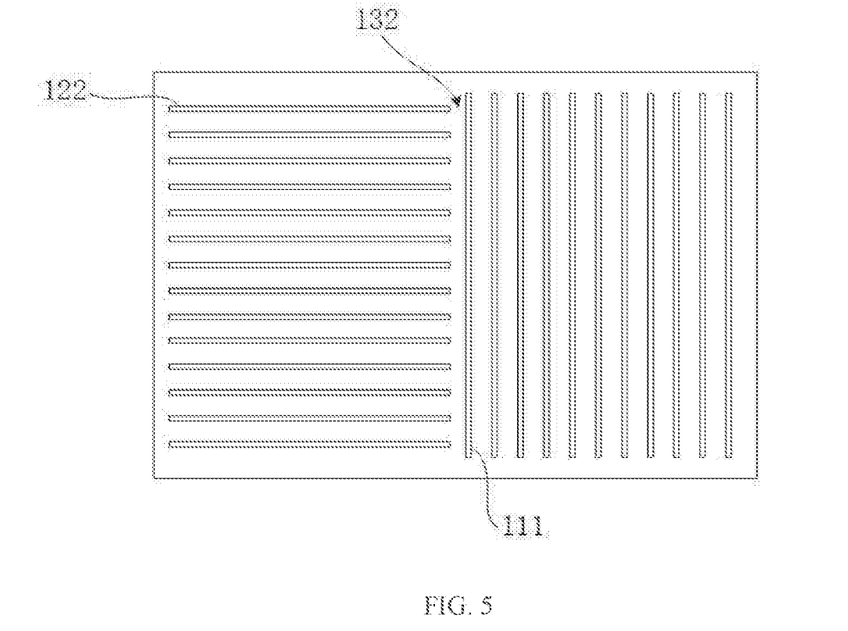

As shown in FIGS. 3-5, in an embodiment, multiple drive lines and sense lines are formed in the partitioned regions on the two surfaces of the substrate of the capacitive touch panel 100. Specifically, the front surface (the surface with an outward orientation in FIG. 3 and the surface in FIG. 4) is divided into two regions (i.e., a left half and a right half) with the same size and shape. Similarly, the back surface (the surface with an inward orientation in FIG. 3, delineated in dashed lines, as well as the surface in FIG. 5) is also divided into two regions (i.e., a left half and a right half) with the same size and shape.

Specifically, as shown in FIGS. 3 and 4, a group of drive lines are formed in the left half of the front surface of the substrate of the touch panel 100, e.g. the drive line 121. These drive lines extend in a horizontal direction from the left edge of the front surface of the substrate to the middle of the front surface of the substrate. A group of sense lines are formed in the right half of the front surface of the substrate, e.g. the sense line 112. These sense lines extend in a vertical direction from the upper edge of the front surface of the substrate to the lower edge of the front surface of the substrate. The drive lines and the sense lines are set apart with a gap 131 located at the vertical axis of the front surface of the substrate, preferably with a width of 0.01-20 mm.

As shown in FIGS. 3 and 5, a group of drive lines are formed in the left half of the back surface (description of the locations of regions in the back surface of the substrate is relative to a view facing the back surface of the substrate, that is, those locations and orientations are described after flipping the back surface along the vertical axis of the substrate) of the substrate of the touch panel 100, e.g. the drive line 122. These drive lines extend in a horizontal direction from the left edge of the back surface of the substrate to the middle of the back surface of the substrate. A group of sense lines are formed in the right half of the back surface of the substrate, e.g. the sense line 111. These sense lines extend in a vertical direction from the upper edge of the back surface of the substrate to the lower edge of the back surface of the substrate. The drive lines and the sense lines are set apart with a gap 132 located at the vertical axis of the back surface of the substrate, preferably with a width of 0.01-20 mm.

Further, as shown in FIG. 3, in an embodiment, multiple drive lines formed on the left half of the front surface of the substrate and multiple drive lines formed on the left half of the back surface of the substrate have the same structure and layout, for example, the same line length, line width, line number, and line space and so on. The nearest pair of drive lines of the two groups formed respectively on the two surfaces of the substrate, for example the drive lines 121 and 122, deviate from one another with less than half of the space. The non-zero deviation will not impact touch control precision, as it is generally a small size in common implementation. In an embodiment, the deviation is zero, i.e., the drive lines of the two groups correspondingly align one to one horizontally, as exemplified by the alignment between the drive line 121 and the drive line 122. The description on the positional inter-relation between the two groups of drive lines formed on the two surfaces of the substrate is valid as well for the two groups of sense lines (as will be described in the embodiments hereinafter) formed on the two surfaces of the substrate.

Further, in an embodiment, multiple sense lines formed on the right half of the front surface of the substrate and multiple sense lines formed on the right half of the back surface of the substrate, preferably have the same structure and layout, and are all sequentially arranged in a horizontal orientation.

It can be seen that the left half of the front surface of the substrate of the touch panel 100 coincides with the right half of the back surface of the substrate along the direction perpendicular to the substrate, while the right half of the front surface of the substrate coincides with the left half of the back surface of the substrate along the direction perpendicular to the substrate. Thus, the multiple drive lines and the sense lines on the two sides of the substrate intersect virtually one with another to form a lattice structure. It is worth noting that two sections (or regions) coinciding along the direction perpendicular to the substrate, or along the direction perpendicular to the surface of the substrate, or along the normal direction of the surface described in the present disclosure, does not mean that the two sections (regions) coincide in the three dimensional space, but shall be understood that the two sections (regions) coincide in a two-dimensional plane perpendicular to the overlooked dimension which is perpendicular to the substrate (or the surface of the substrate); that is, as observed from the dimension perpendicular to the substrate (or the surface of the substrate), the two sections (regions) coincide. Further, unless otherwise specified, each region in the specification is located in the active region of the touch panel.

In actual usage, as shown in FIG. 3, the ends (at the left edge of the front surface of the substrate) of the multiple drive lines on the left half of the front surface of the substrate of the touch panel 100, are connected electrically to a drive chip to receive a drive signal $S_D$ from the drive chip, with the other ends (in the middle of the front surface of the substrate) left floating. In the meantime, the ends (at the left edge of the back surface of the substrate) of the multiple drive lines on the left half of the back surface of the substrate of the touch panel 100 are connected electrically to the drive chip to receive the drive signal $S_D$ from the drive chip, with the other ends (in the middle of the back surface of the substrate) left floating. In addition, the ends (at the lower edge of the front surface of the substrate) of the multiple sense lines on the right half of the front surface of the substrate of the touch panel 100 are connected electrically to a sense chip, with the other ends (at the upper edge of the front surface of the substrate) left floating. In the meantime, the ends (at the lower edge of the back surface of the substrate) of the multiple sense lines on the right half of the back surface of the substrate of the touch panel 100 are also connected electrically to the sense chip, with the other ends (at the upper edge of the back surface of the substrate) left floating, for the sense chip to receive the sense signal $S_S$ from the multiple sense lines.

In actual employment, the drive chip simultaneously provides the drive signal $S_D$ to the two groups of the drive lines from the two edges of the substrate in a sequentially scanning manner (such as from top to bottom), while the sense chip simultaneously reads the sense signal $S_S$ from the various sense lines.

Figure 6:
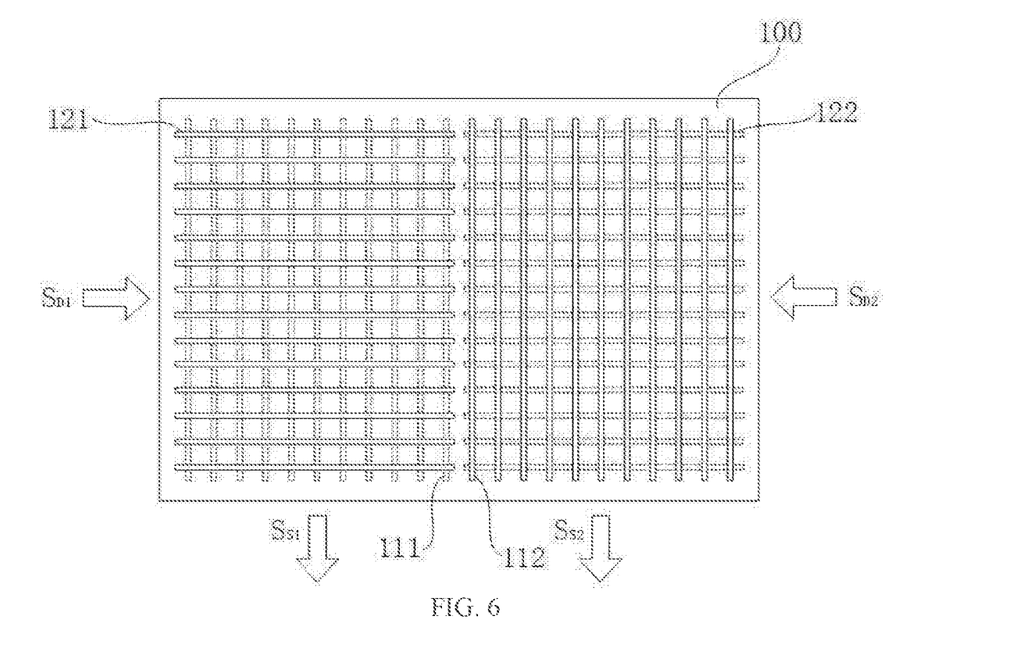
FIG. 6 shows another usage of signal drive/sense for the capacitive touch panel in FIG. 3.

FIG. 6 provides a variation of the foregoing embodiment for the capacitive touch panel 100 with the employment of two drive chips and two sense chips. The ends (at the left edge of the front surface of the substrate) of the multiple drive lines on the left half of the front surface of the substrate of the touch panel 100 are connected electrically to a drive chip (in addition, the ends can be connected to the drive chip through peripheral circuits, for reduction of FPC length and hot pressing complexity) to receive a drive signal $S_{D1}$ from the drive chip, with the other ends (in the middle of the front surface of the substrate) left floating. In the meantime, the ends (at the left edge of the back surface of the substrate) of the multiple drive lines on the left half of the back surface of the substrate of the touch panel 100 are connected electrically to another drive chip to receive a drive signal $S_{D2}$ from the drive chip, with the other ends (in the middle of the back surface of the substrate) left floating. Further, the ends (at the lower edge of the front surface of the substrate) of the multiple sense lines on the right half of the front surface of the substrate of the touch panel 100 are connected electrically to a sense chip (in addition, the ends can be connected to the sense chip through peripheral circuits, for reduction of FPC length and hot pressing complexity) to receive a sense signal $S_{S1}$ from the multiple sense lines, with the other ends (at the upper edge of the front surface of the substrate) left floating. In the meantime, the ends (at the lower edge of the back surface of the substrate) of the multiple sense lines on the right half of the back surface of the substrate of the touch panel 100 are connected electrically to another sense chip, for the sense chip to receive a sense signal $S_{S2}$ from the multiple sense lines, with the other ends (at the upper edge of the back surface of the substrate) left floating.

In actual employment, one drive chip simultaneously provides the drive signal $S_{D1}$ to one group of the drive lines in a sequentially scanning manner (such as from top to bottom), while the other drive chip simultaneously provides the drive signal $S_{D2}$ to the other group of the drive lines in a sequentially scanning manner (such as from top to bottom). One sense chip simultaneously reads the sense signal $S_{S1}$ from one group of the sense lines, while the other sense chip simultaneously reads the sense signal $S_{S2}$ from the other group of the sense lines.

A person skilled in the art shall understand that the essence of the foregoing usage is the division of the touch panel 100 into two independent sections (that is, the left half and the right half of the touch panel 100, wherein the left half of the touch panel 100 includes the left half of the substrate, with the multiple drive lines formed in the left half of the front surface of the substrate, and the multiple sense lines formed in the right half of the back surface of the substrate; while the right half of the touch panel 100 includes the right half of the substrate, with the multiple sense lines formed in the right half of the front surface of the substrate, and the multiple drive lines formed in the left half of the back surface of the substrate) for signal drive and sense. Thus, it shall not be restricted to the employment of two drive chips and two sense chips, so long as one drive chip and one sense chip would suffice for manipulation of signal drive and sense.

It is worth noting that the drive lines and the sense lines in the foregoing embodiments are interchangeable, thus the drive chips and the sense chips are also interchangeable. That is, the drive lines 121 and 122 shown in FIG. 3 may be sense lines for output of the sense signal $S_S$, while the sense lines 111 and 112 may be drive lines for providing the drive signal $S_D$. Further, the drive lines and the sense lines in all the embodiments of the present disclosure are interchangeable, and thus the drive chips and the sense chips are interchangeable as well.

In the present embodiment, each of the front surface and the back surface of the substrate is divided into two identical regions, the left half and the right half. The regions might be different in size in other embodiments. For example, as shown in FIG. 7, wherein the front surface of the substrate of the capacitive touch panel 200 is divided into two non-identical rectangular regions: a smaller left half and a bigger right half; similarly, the back surface of the substrate is also divided into two non-identical rectangular regions: a bigger left half and a smaller right half.

Similarly to the embodiment in FIG. 6, multiple horizontally extending drive lines are formed in the left half of the front surface of the substrate of the touch panel 200, as exemplified by the drive line 221, while multiple vertically extending sense lines are formed in the right half of the front surface of the substrate, as exemplified by the sense line 212. Multiple horizontally extending drive lines are formed in the left half of the back surface of the substrate, as exemplified by the drive line 222, while multiple vertically extending sense lines are formed in the right half of the back surface of the substrate, as exemplified by the sense line 211.

The structure and layout of the multiple drive lines formed in the front and back surfaces of the substrate are the same as those in the embodiment of FIG. 6, except a difference in length. Due to a different length of the region where the multiple drive lines are located, the required length of the multiple drive lines is not the same. Further, the structure and layout of the multiple sense lines formed in the front and back surfaces of the substrate are the same as those in the embodiment of FIG. 6, except a difference in the number of the sense lines. Due to a different length of the region where the multiple sense lines are located, the number of sense lines accommodated in the regions is not the same.

Figure 7:
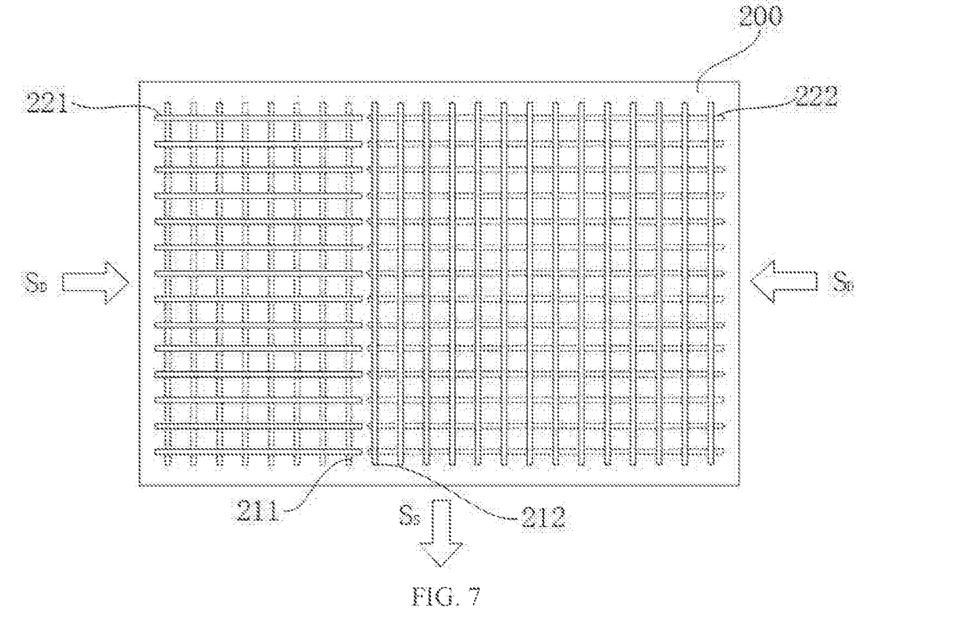
FIG. 7 is a schematic diagram of the capacitive touch panel of a second embodiment of the present disclosure.

Albeit with the difference between the present embodiment of FIG. 7 and the embodiment of FIG. 6, the mode of employment for both is the same. The two groups of the drive lines on the front and back surfaces of the substrate may be connected to a same drive chip for simultaneous reception of the drive signal $S_D$ from the drive chip; the two groups of the sense lines on the front and back surfaces of the substrate may be connected to a same sense chip, so that the sense lines are sequentially detected by the sense chip to obtain a sense signal $S_S$. Further, the two groups of the drive lines on the front and back surfaces of the substrate may be connected to two different drive chips respectively, while the two groups of the sense lines on the front and back surfaces of the substrate may be connected to two different sense chips, for separate signal drive and sense on the left half and the right half of the substrate.

Figure 8:
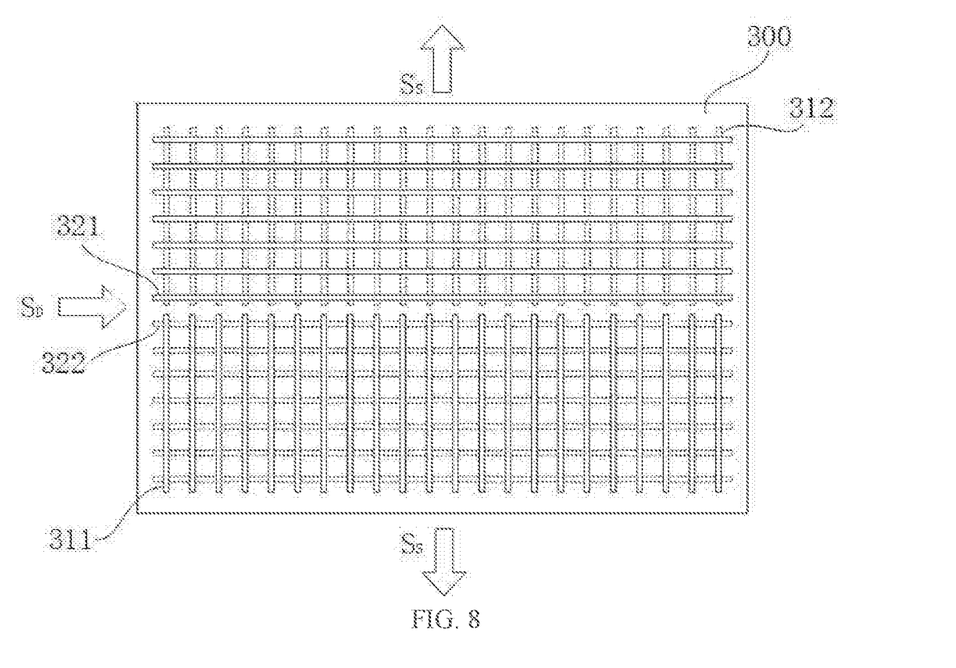
FIG. 8 is a schematic diagram of the capacitive touch panel of a third embodiment of the present disclosure.
Figure 9:
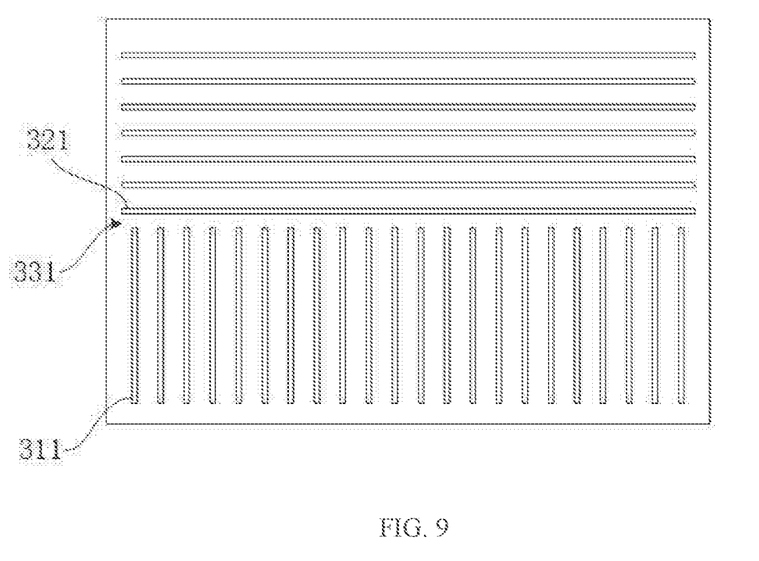
FIG. 9 shows the surface structure of the capacitive touch panel in FIG. 8.

The third embodiment of the present disclosure is shown in FIGS. 8 and 9, wherein the front surface of the substrate of the capacitive touch panel 300 is divided into an upper half and a lower half with the same size and shape; similarly, the back surface of the substrate is divided into an upper half and a lower half with the same size and shape.

A group of drive lines are formed on the upper half of the front surface of the substrate of the capacitive touch panel 300, as exemplified by the drive line 321. The drive lines extend along a horizontal direction from the left edge to the right edge of the front surface of the substrate. A group of sense lines are formed on the lower half of the front surface of the substrate, as exemplified by the sense line 311. The sense lines extend along a vertical direction from the lower edge to the middle of the front surface of the substrate. The drive lines and the sense lines are set apart with a gap 331, with the gap 331 located at the horizontal axis of the front surface of the substrate of the capacitive touch panel 300, and preferably having a width of 0.01-20 mm.

Similarly, a group of drive lines are formed on the lower half of the back surface of the substrate of the capacitive touch panel 300, as exemplified by the drive line 322, which extend along a horizontal direction from the left edge to the right edge of the back surface of the substrate. A group of sense lines are formed on the upper half of the back surface of the substrate, as exemplified by the sense line 312, which extend along a vertical direction from the upper edge to the middle of the back surface of the substrate. The drive lines and the sense lines are set apart with a gap located at the horizontal axis of the back surface of the substrate of the capacitive touch panel 300, and preferably having a width of 0.01-20 mm.

As shown in FIG. 8, the multiple drive lines formed on the upper half of the front surface of the substrate and those formed on the lower half of the back surface of the substrate preferably have the same structure and layout, that is, the same line length, line width, line number, and line space and so on, and are sequentially arranged with a vertical orientation. Further, the multiple sense lines formed on the lower half of the front surface of the substrate and those formed on the upper half of the back surface of the substrate preferably have the same structure and layout and are aligned one to one correspondingly along the vertical direction.

In the present embodiment, the upper half of the front surface of the substrate of the capacitive touch panel 300 coincides with the upper half of the back surface of the substrate along the direction perpendicular to the substrate, while the lower half of the front surface of the substrate and the lower half of the back surface of the substrate also coincide along the direction perpendicular to the substrate, so that the multiple drive lines and the sense lines on the two sides of the substrate virtually intersect one with another to form a lattice structure.

In actual usage, as shown in FIG. 8, the ends (at the left edge of the front surface of the substrate) of the multiple drive lines on the upper half of the front surface of the substrate of the touch panel 300 are connected electrically to a drive chip to receive a drive signal $S_D$ from the drive chip, with the other ends (at the right edge of the front surface of the substrate) of the multiple drive lines left floating. In the meantime, the ends (at the right edge of the back surface of the substrate) of the multiple drive lines on the lower half of the back surface of the substrate of the touch panel 300 are connected electrically to the drive chip to receive the drive signal $S_D$ from the drive chip, with the other ends (at the right edge of the back surface of the substrate) left floating. In addition, the ends (at the lower edge of the front surface of the substrate) of the multiple sense lines on the lower half of the front surface of the substrate of the touch panel 300 are connected electrically to a sense chip, with the other ends (in the middle of the front surface of the substrate) left floating. In the meantime, the ends (at the upper edge of the back surface of the substrate) of the multiple sense lines on the upper half of the back surface of the substrate of the touch panel 300 are also connected electrically to the sense chip, with the other ends (in the middle of the back surface of the substrate) left floating, for the sense chip to receive the sense signal $S_S$ from the multiple sense lines.

In actual employment, the drive chip simultaneously provides the drive signal $S_D$ to the two groups of the drive lines in a sequentially scanning manner (such as from top to bottom), while the sense chip simultaneously reads the sense signal $S_S$ from the two groups of sense lines.

Figure 10:
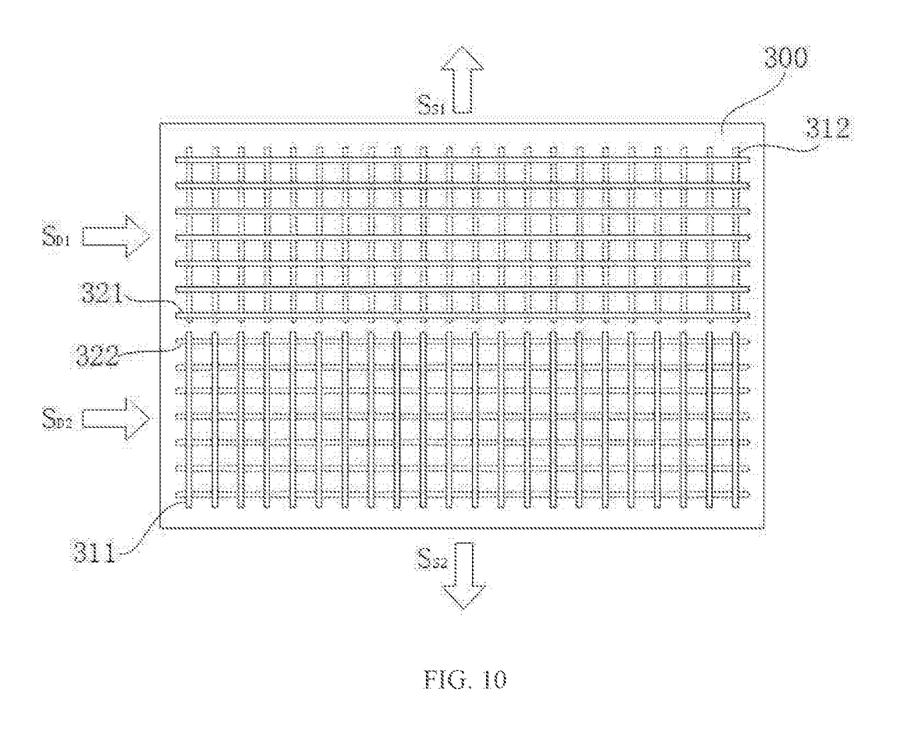
FIG. 10 shows another usage of signal drive/sense for the capacitive touch panel in FIG. 8.

FIG. 10 provides a variation of the embodiment of FIG. 8 for the capacitive touch panel 300, with the employment of two drive chips and two sense chips. Wherein the ends (at the left edge of the front surface of the substrate) of the multiple drive lines on the upper half of the front surface of the substrate of the touch panel 300 are connected electrically to a drive chip to receive a drive signal $S_{D1}$ from the drive chip, with the other ends (at the right edge of the front surface of the substrate) left floating. In the meantime, the ends (at the right edge of the back surface of the substrate) of the multiple drive lines on the lower half of the back surface of the substrate of the touch panel 300 are connected electrically to another drive chip to receive a drive signal $S_{D2}$ therefrom, with the other ends (at the left edge of the back surface of the substrate) left floating. Further, the ends (at the lower edge of the front surface of the substrate) of the multiple sense lines on the lower half of the front surface of the substrate of the touch panel 100 are connected electrically to a sense chip for the sense chip to receive a sense signal $S_{S2}$ from the multiple sense lines, with the other ends (in the middle of the front surface of the substrate) left floating. In the meantime, the ends (at the upper edge of the back surface of the substrate) of the multiple sense lines on the upper half of the back surface of the substrate of the touch panel 300 are connected electrically to another sense chip for the sense chip to receive a sense signal $S_{S1}$ from the multiple sense lines, with the other ends (in the middle of the back surface of the substrate) left floating.

In actual employment, one drive chip simultaneously provides the drive signal $S_{D1}$ to one group of the drive lines in a sequentially scanning manner (such as from top to bottom), while the other drive chip simultaneously provides the drive signal $S_{D2}$ to the other group of the drive lines in a sequentially scanning manner (such as from top to bottom). One sense chip simultaneously reads the sense signal $S_{S1}$ from one group of the sense lines, while the other sense chip simultaneously reads the sense signal $S_{S2}$ from the other group of the sense lines.

Figure 11:
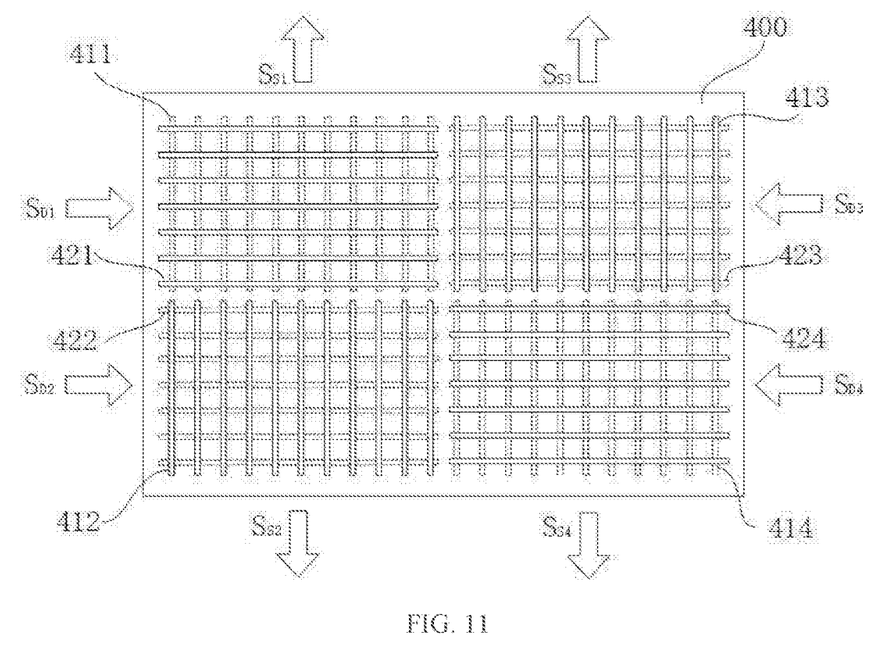
FIG. 11 is a schematic diagram of the capacitive touch panel of a fourth embodiment of the present disclosure.
Figure 12:
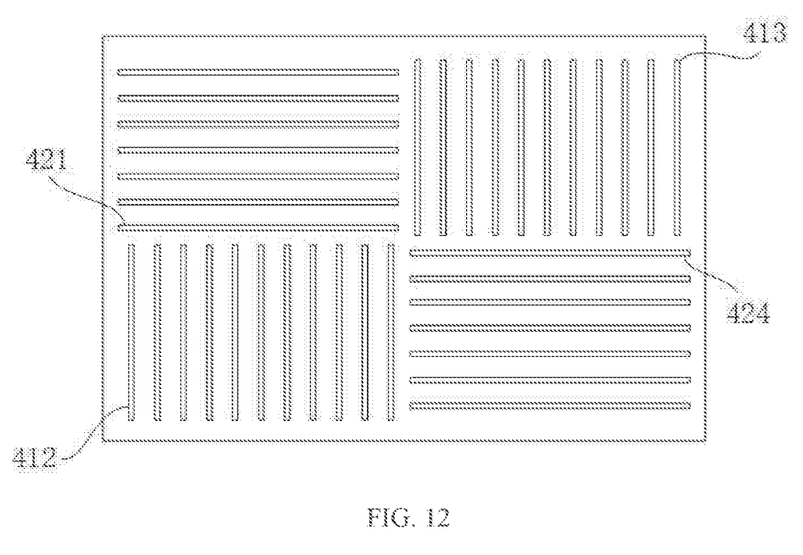
FIG. 12 shows the surface structure of the capacitive touch panel in FIG. 11.

The fourth embodiment of the present disclosure is shown in FIGS. 11 and 12, wherein the front surface of the substrate of the capacitive touch pale 400 is divided into an upper left section, an upper right section, a lower left section, and a lower right section with the same size and shape. Similarly, the back surface of the substrate is also divided into an upper left section, an upper right section, a lower left section, and a lower right section with the same size and shape, which is ¼ of the substrate surface.

A group of drive lines, e.g. the drive line 421, are formed in the upper left section of the front surface of the substrate of the capacitive touch panel 400. The drive lines extend horizontally from the left edge of the front surface of the substrate to the middle of the front surface. Another group of multiple drive lines, e.g. the drive line 424, are formed in the lower right section of the front surface of the substrate. The drive lines extend horizontally from the right edge of the front surface of the substrate to the middle of the front surface. A group of sense lines, e.g. the sense line 412, are formed in the lower left section of the front surface of the substrate. The sense lines extend vertically from the lower edge of the front surface of the substrate to the middle of the front surface. Another group of multiple sense lines, e.g. the sense line 413, are formed in the upper right section of the front surface of the substrate. The sense lines extend vertically from the upper edge of the front surface of the substrate to the middle of the front surface.

Similarly, a group of drive lines, e.g. the drive line 423, are formed in the upper left section of the back surface of the substrate of the capacitive touch panel 400. The drive lines extend horizontally from the left edge of the back surface of the substrate to the middle of the back surface. Another group of multiple drive lines, e.g. the drive line 422, are formed in the lower right section of the back surface of the substrate. The drive lines extend horizontally from the right edge of the back surface of the substrate to the middle of the back surface. A group of sense lines, e.g. the sense line 414, are formed in the lower left section of the back surface of the substrate. The sense lines extend vertically from the lower edge of the back surface of the substrate to the middle of the back surface. Another group of multiple sense lines, e.g. the sense line 411, are formed in the upper right section of the back surface of the substrate. The sense lines extend vertically from the upper edge of the back surface of the substrate to the middle of the back surface.

Preferably, the two groups of multiple drive lines formed in the upper left and upper right sections on the front surface of the substrate, and the two groups of multiple drive lines formed in the upper left and upper right sections on the back surface of the substrate have the same structure and layout, for example the same line length, line width, number of lines and line space, as shown in FIG. 11. They are arranged sequentially in the vertical direction and align one with another in the horizontal direction. Further, the multiple sense lines formed in the upper right and lower left sections on the front surface of the substrate and the multiple sense lines formed in the upper right and lower left sections on the back surface of the substrate preferably have the same structure and layout, aligning one with another in the vertical direction, and being arranged sequentially in the horizontal direction.

In the present embodiment, the upper left section on the front surface of the substrate of the capacitive touch panel 400 and the upper left section on the back surface of the substrate coincide along the direction perpendicular to the substrate; the upper right section on the front surface of the substrate and the upper right section on the back surface of the substrate coincide along the direction perpendicular to the substrate; the lower left section on the front surface of the substrate and the lower left section on the back surface of the substrate coincide along the direction perpendicular to the substrate; the lower right section on the front surface of the substrate and the lower right section on the back surface of the substrate also coincide along the direction perpendicular to the substrate. Accordingly, the multiple drive lines and the sense lines on the two sides of the substrate intersect virtually to form a lattice structure.

Employment of four drive chips and four sense chips is shown in FIG. 11. The ends (at the left edge of the front surface of the substrate) of the multiple drive lines in the upper left section on the front surface of the substrate of the touch panel 400 are electrically connected to a drive chip to receive the drive signal $S_{D1}$ therefrom, with the other ends (in the middle of the front surface of the substrate) left floating. The ends (at the right edge of the front surface of the substrate) of the multiple drive lines in the lower right section on the front surface of the substrate of the touch panel 400 are electrically connected to anther drive chip to receive the drive signal $S_{D4}$ therefrom, with the other ends (in the middle of the front surface of the substrate) left floating. The ends (at the left edge of the back surface of the substrate) of the multiple drive lines in the upper left section on the back surface of the substrate of the touch panel 400 are electrically connected to yet another drive chip to receive the drive signal $S_{D3}$ therefrom, with the other ends (in the middle of the back surface of the substrate) left floating. The ends (at the right edge of the back surface of the substrate) of the multiple drive lines in the lower right section on the back surface of the substrate of the touch panel 400 are electrically connected to yet another drive chip to receive the drive signal $S_{D2}$ therefrom, with the other ends (in the middle of the back surface of the substrate) of the multiple drive lines left floating.

Further, the ends (at the lower edge of the front surface of the substrate) of the multiple sense lines in the lower left section on the front surface of the substrate of the touch panel 400 are connected electrically to a sense chip for the sense chip to receive a sense signal $S_{S2}$ from the sense lines, with the other ends (in the middle of the front surface of the substrate) left floating. In the meantime, the ends (at the upper edge of the front surface of the substrate) of the multiple sense lines in the upper right section on the front surface of the substrate of the touch panel 400 are connected electrically to another sense chip for the sense chip to receive a sense signal $S_{S3}$ from the sense lines, with the other ends (in the middle of the front surface of the substrate) left floating. In the meantime, the ends (at the lower edge of the back surface of the substrate) of the multiple sense lines in the lower left section on the back surface of the substrate of the touch panel 400 are connected electrically to yet another sense chip for the sense chip to receive a sense signal $S_{S4}$ from the sense lines, with the other ends (in the middle of the back surface of the substrate) left floating. In the meantime, the ends (at the upper edge of the back surface of the substrate) of the multiple sense lines in the upper right section on the back surface of the substrate of the touch panel 400 are connected electrically to yet another sense chip for the sense chip to receive a sense signal $S_{S1}$ from the sense lines, with the other ends (in the middle of the back surface of the substrate) left floating.

In actual employment, the four drive chips provide drive signals $S_{D1}$-$S_{D4}$ respectively to the four groups of the drive lines in a sequentially scanning manner (for example from top to bottom); while the four sense chips read the sense signals $S_{S1}$-$S_{S4}$ from the four groups of the sense lines respectively.

Albeit not shown in FIG. 11, a person skilled in the art shall understand that only one drive chip can be employed for connection to the ends of the multiple drive lines on the periphery of the touch panel, to send a drive signal sequentially to the drive lines; and that only one sense chip can be employed for connection to the ends of the multiple sense lines on the periphery of the touch panel to receive a sense signal from the sense lines sequentially. Preferably, the drive chip may simultaneously send a drive signal to a pair of horizontally aligned drive lines, while the sense chip may receive a sense signal simultaneously from a pair of vertically aligned sense lines.

Figure 13:
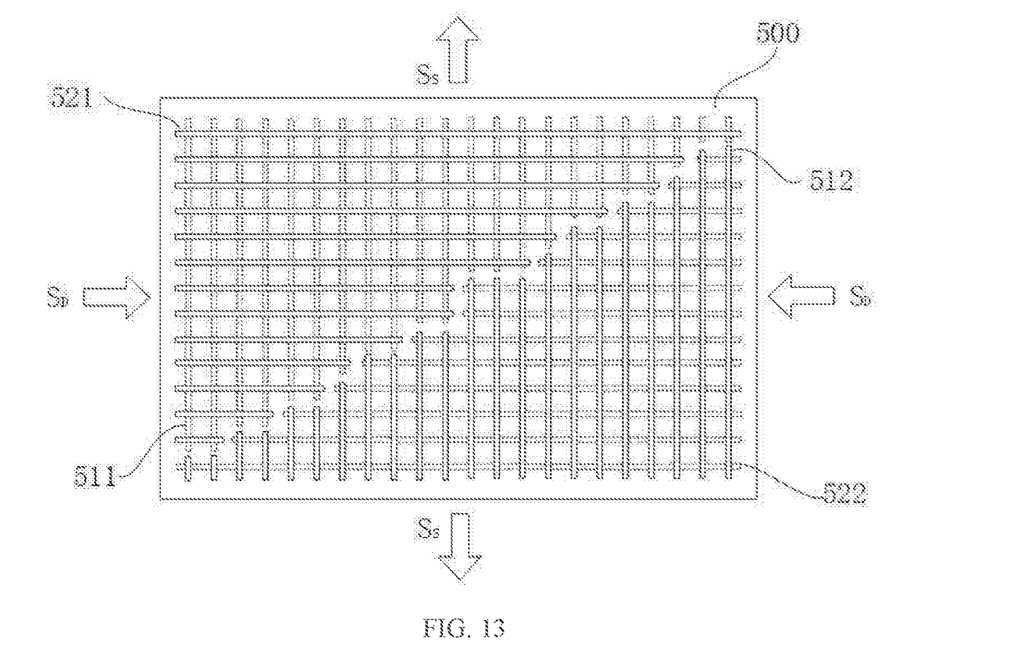
FIG. 13 is a schematic diagram of the capacitive touch panel of a fifth embodiment of the present disclosure.
Figure 14:
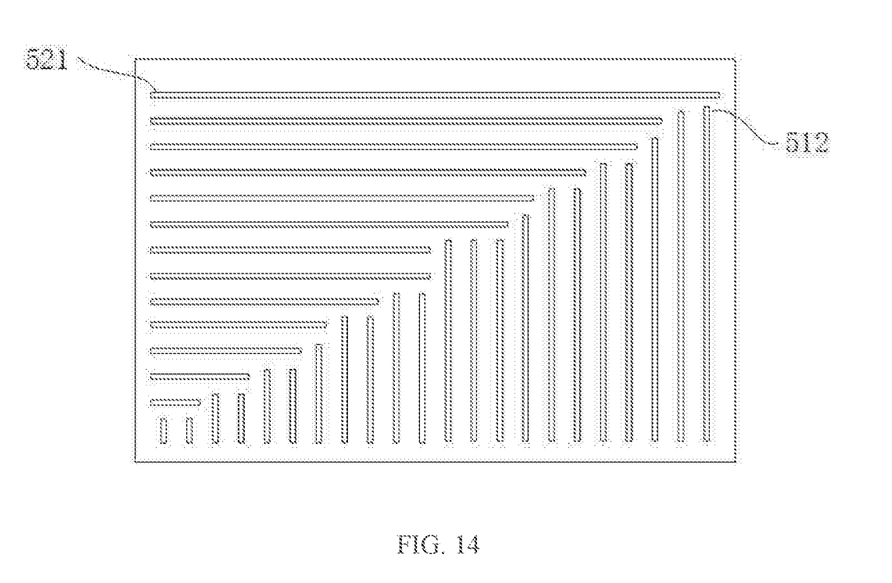
FIG. 14 shows the surface structure of the capacitive touch panel in FIG. 13.

In the various foregoing embodiments, the surfaces of the substrate of the touch panel are divided into either two or four rectangular regions. The regions may be in other shapes in other embodiments, so long as each of the partitioned regions has a section close to two contiguous edges of the substrate, with the section as the periphery of the corresponding partitioned region. The fifth embodiment of the present disclosure is shown in FIGS. 13 and 14, wherein the front surface of the substrate of the capacitive touch panel 500 is divided into two approximately identical triangular regions: an upper left section and a lower right section; similarly, the back surface of the substrate is also divided into two approximately identical triangular regions: an upper left section and a lower right section.

Multiple horizontally extending drive lines are formed in the upper left section on the front surface of the substrate of the touch panel 500, e.g. the drive line 521, while multiple vertically extending sense lines are formed in the lower right section, e.g. the sense line 512. Multiple horizontally extending drive lines are formed in the lower left section on the back surface of the substrate, e.g. the drive line 522, while multiple vertically extending sense lines are formed in the upper right section, e.g. the sense line 511. The drive lines and the sense lines on the two sides of the substrate virtually intersect to form a lattice structure.

In actual employment, the two groups of the drive lines on the front and back surfaces of the substrate of the touch panel 500 may be electrically connected to a same drive chip to simultaneously receive a drive signal $S_D$ therefrom. The two groups of the sense lines on the front and back surfaces of the substrate may be electrically connected to a same sense chip, so that the two groups of the sense lines may be simultaneously detected by the sense chip to obtain a sense signal $S_S$. Further, the two groups of the drive lines on the front and back surfaces of the substrate may be electrically connected to two different drive chips, while the two groups of the sense lines on the front and back surfaces of the substrate may also be electrically connected to two different sense chips, so that signal drive and sense are conducted on the left half and the right half of the substrate separately.

In other embodiments, the substrate surfaces of the touch panel may also be divided into two approximately identical trapezoids, pentagons, other polygons, or even irregular shapes.

Figure 15:
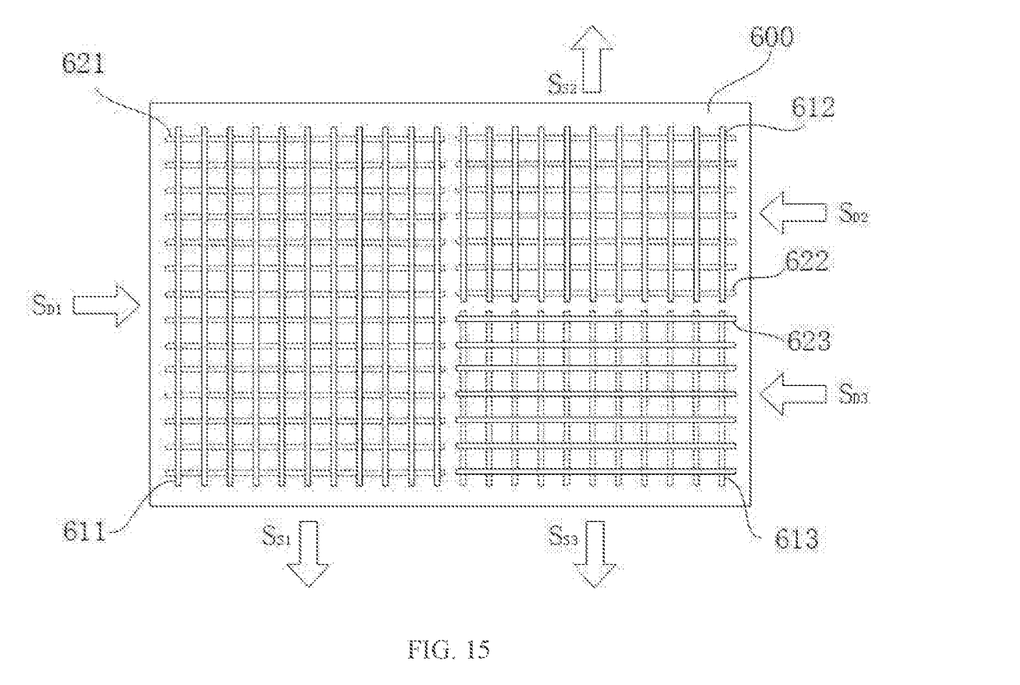
FIG. 15 is a schematic diagram of the capacitive touch panel of a sixth embodiment of the present disclosure.

Further, the surfaces of the substrate of the touch panel may be divided into three regions, for example rectangular regions, so long as each of the divided regions has part of the two contiguous edges of the substrate as the periphery of the divided region. The embodiment as shown in FIG. 15 has the front surface of the substrate of the capacitive touch panel being divided into three rectangular regions: a left half section, an upper right section, and a lower right section; similarly, the back surface of the substrate is also divided into three rectangular regions: an upper left section, a lower left section, and a right half section.

Multiple vertically extending sense lines are formed in the left half section on the front surface of the substrate of the touch panel 500, e.g. the sense line 611; multiple vertically extending sense lines are formed in the upper right section, e.g. the sense line 612; multiple horizontally extending drive lines are formed in the lower right section, e.g. the drive line

623. Multiple horizontally extending drive lines are formed in the upper left section on the back surface of the substrate, e.g. the drive line 622; multiple vertically extending sense lines are formed in the lower left section, e.g. the sense line 613; multiple horizontally extending drive lines are formed in the right half section, e.g. the drive line 621. The drive lines and the sense lines on the two sides of the substrate virtually intersect to form a lattice structure.

With the employment of three drive chips and three sense chips, the three groups of the drive lines on the front and back surfaces of the substrate of the touch panel 600 are respectively connected to a different drive chip to receive simultaneously drive signals $S_{D1}$, $S_{D2}$, and $S_{D3}$ therefrom; the three groups of the sense lines on the front and back surfaces of the substrate are respectively connected to a different sense chip, so that the sense lines are detected by the three sense chips to obtain sense signals $S_{S1}$, $S_{S2}$, and $S_{S3}$. In addition, the three groups of the drive lines on the front and back surfaces of the substrate may be connected to a same drive chip, while the three groups of the sense lines may also be connected to a same sense chip, for sequential signal drive and sense.

It can be seen that formation of three regions on the surfaces of the substrate may lead to contiguity of at least parts of the drive lines in the same surface, as is the case with the prior art shown in FIG. 2. Hence, drive signal interference is possible. However, the extent of interference with the present embodiment is far less than that in the prior art in FIG. 2. Therefore, the capacitive touch panel provided by the present embodiment is effective in reducing signal interference in-between the drive/sense lines, as well in reducing resistance of the drive/sense lines.

Figure 16:
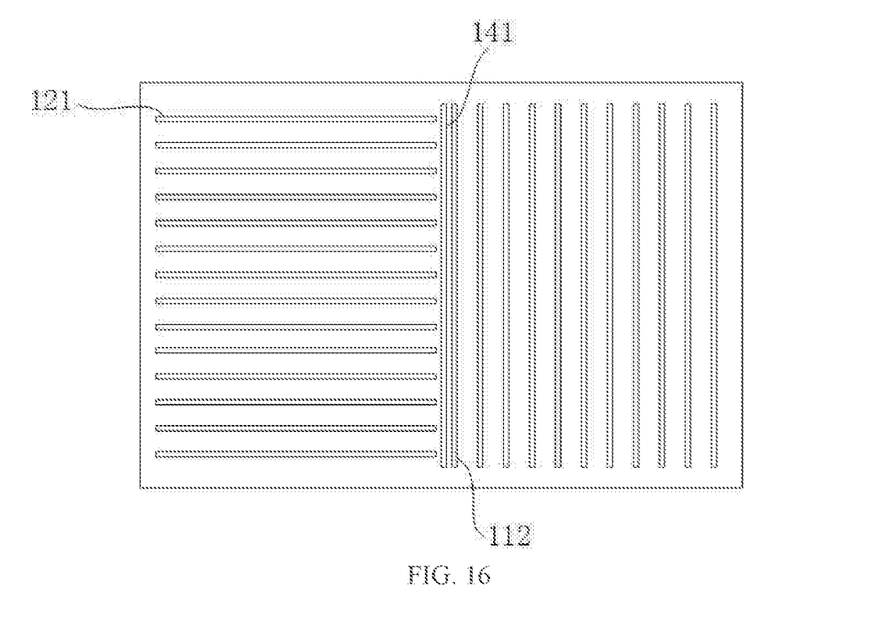
FIGS. 16 and 17 show an improvement of the surface structure of the capacitive touch panel of the first embodiment, wherein ground wires are arranged in-between the numerous regions in the same surface.
Figure 17:
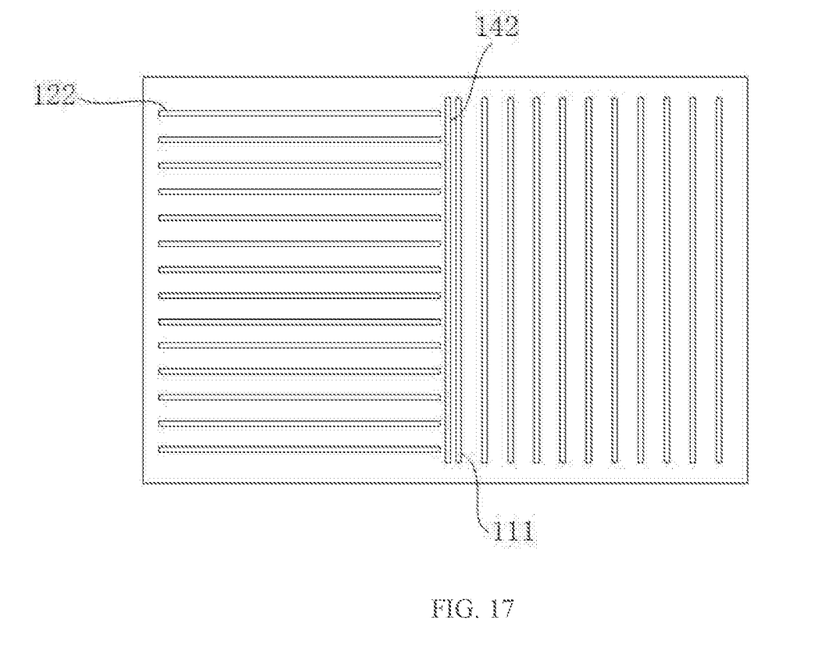

Further, grounding wires may be arranged in-between the various regions on each surface of the substrate of the capacitive touch panel of the present disclosure, for further reduction of signal interferences among the conducting lines in the various regions. The first embodiment is taken as an example in description of grounding wire arrangement in-between the various regions on a surface of the substrate. As shown in FIG. 16, the grounding wire 141 is disposed between the left half and the right half on the front surface of the substrate, extending along the central axis of the front surface of the substrate from one edge of the front surface of the substrate to the opposing edge, with at least one end of the grounding wire being grounded. It can be seen that the grounding wire 141 extends within the gap 131 and cannot be connected to the drive lines and the sense lines on either side. Thanks to the grounding wire 141, signal interference in-between the drive lines (such as the drive line 121) and the sense lines (such as the sense line 112) is substantially reduced. Similarly, as shown in FIG. 17, the grounding wire 142 is disposed in-between the left half and the right half regions of the back surface of the substrate, extending within the gap 132 from one edge of the back surface of the substrate to the other edge, with at least one end of the grounding wire being grounded. Thanks to the grounding wire 142, signal interference in-between the drive lines (such as the drive line 122) and the sense lines (such as the sense line 111) is substantially reduced.

Arrangement of grounding wires on the front and back surfaces of the substrate of the capacitive touch panel in other embodiments of the present disclosure is similar to the foregoing example, and thus will not be repeated. It is appreciated that one or multiple grounding wires may be disposed according to the number and layout of the regions on the front and back surfaces of the substrate, and that the grounding wires extend in-between the neighboring regions, with at least one end thereof extending to the periphery of the touch panel to be grounded.

The grounding wires may be of the same material as the drive and sense lines on the surface thereof, for example ITO. In an embodiment, they are formed in the same process as that in making the capacitive touch panel. For example, drive lines, sense lines, and grounding wires on the front/back surfaces of the substrate are formed at the same time as the ITO layer is etched on the front/back surfaces of the substrate of the capacitive touch panel.

Furthermore, in view of a drawback of insensitive touch reaction on peripheries of the active region (operable region) of the touch panel, one or more additional conducting lines can be placed on peripheries of one or more regions on one or two surfaces of the capacitive touch panel having drive and sense lines in divided regions, so as to enhance touch sensitivity on peripheries of the active region of the touch panel. The first embodiment as shown in FIG. 3 is taken as an example to explain how to arrange and use the additional conducting line.

Figure 18:
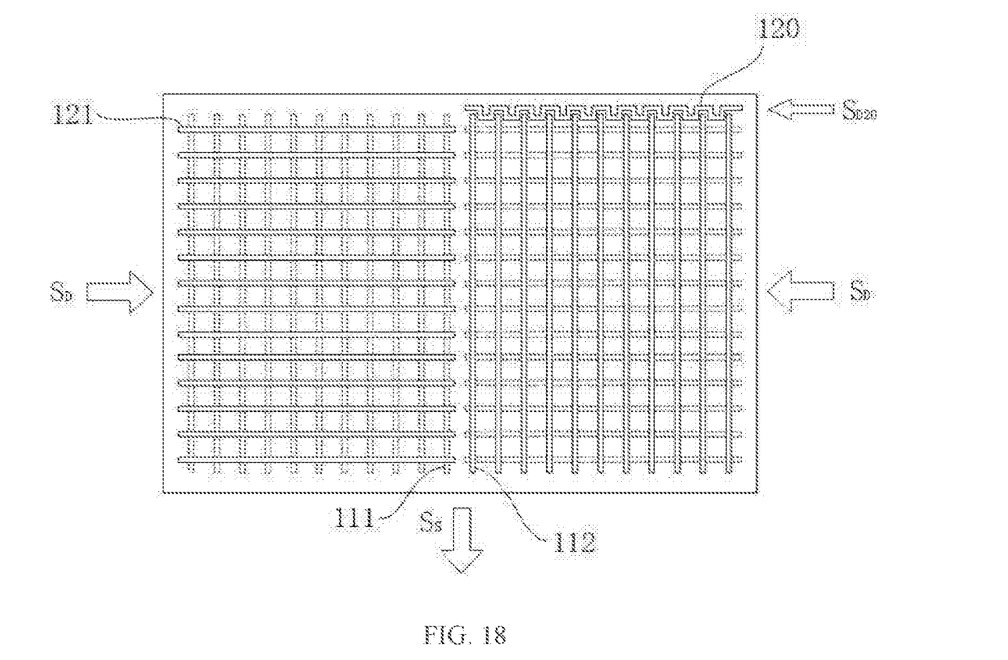
FIG. 18 shows an improvement of the capacitive touch panel of the first embodiment; wherein an additional conducting line is placed in a region on a surface of the capacitive touch panel.

As shown in FIG. 18, in a region of the front surface of the capacitive touch panel in the first embodiment as shown in FIG. 3, an additional conducting line 120 is provided. The conducting line 120 is arranged at an upper edge (close to the edge of the substrate) of this region and is a drive line. The conducting line 120 extends from the right edge of the front surface of the substrate to the middle of the front surface and is adjacent to floating ends of a group of sense lines in this region.

One end of the additional conducting line 120, at the right edge of the front surface of the substrate, is electrically connected to a drive chip, to receive the drive signal $S_{D20}$ from the drive chip, while the other end of the additional conducting line 120 left floating. In other embodiments, the other end of the additional conducting line 120 is not floating, instead, the other end extends to the left edge of the front surface of the substrate or extends to the upper edge of the front surface of the substrate. In the embodiment where two ends of the additional conducting line 120 are both at edges of the substrate, one end of the additional conducting line 120 is connected to a drive chip (or sense chip) to receive a drive signal (or output a sense signal) while the other end left floating; alternatively, the two ends are both connected to a drive chip (or sense chip) to receive drive signals (or output sense signals) from the drive chip (or sense chip).

Further, in an embodiment as shown in FIG. 18, the additional conducting line 120 is curved or bent, and has a plurality of bent parts. These bent parts correspond to floating ends of the group of sense lines in this region, respectively, and each bend part at least partly surrounds the floating end of the corresponding sense line. Thus, the additional conducting line has larger bent parts adjacent to the floating ends of sense lines, so that a stronger drive signal can be provided on periphery of the active region of the touch panel, thereby enhancing touch sensitivity on periphery of the active region of the touch panel.

Similarly, an additional conducting line, can be added on the left part of the front surface of the conductive touch panel shown in FIG. 3, and the additional conducting line is a sense line. The additional conducting line is adjacent to the floating end of each of a group of drive lines (for example, drive line 121) and outputs a sense signal. Further, an additional conducting line can be provided on the left part or/and right part of the back surface of the conductive touch panel.

A similar additional conducting line can be provided in one or more regions on the front surface or/and back surface of the conductive touch panel in other embodiments recited in the specification. A person skilled in the art shall know how to place one or more additional conducting lines on the touch panel in the other embodiments, based on the description on how to place an additional conducting line as shown in FIG. 18, and thus the description will not be repeated herein.

It is worth noting that the term "drive chip" and the term "sense chip" are employed in various embodiments of the present disclosure respectively, in description of a chip connected to the multiple drive lines for providing a drive signal thereto, and a chip connected to the multiple sense lines for receiving a sense signal therefrom. However, in actual usage, a single chip can be employed in realizing the functions of drive chip and the sense chip of the present disclosure in the meantime. In such a case, the part of the single chip having a function of drive chip shall be regarded as corresponding to the drive chip in the disclosure, while the part of the single chip having a function of sense chip shall be regarded as corresponding to the sense chip in the disclosure.

The embodiments of the present disclosure have been described in detail. It shall be understood that various modifications and changes may be made by a person skilled in the art based on the conception of the present disclosure without rendering creative work. Therefore, all the technical solutions capable of being provided by a person skilled in the art by means of logic analysis, inference, and limited experiments based on the conception of the present disclosure shall fall within the scope thereof as defined by the appended claims.

What is claimed is:

1. A capacitive touch panel, comprising a substrate, wherein a first surface of the substrate comprises a first region and a second region, and a second surface of the substrate comprises a third region and a fourth region, with the first region and the fourth region coinciding in a direction perpendicular to the first surface and the second surface, the second region and the third region coinciding in a direction perpendicular to the first surface and the second surface;
    a first group of first conducting lines is formed in the first region, a first group of second conducting lines is formed in the second region, a second group of the first conducting lines is formed in the third region, and a second group of the second conducting lines is formed in the fourth region;
    each of the first conducting lines of the first group and the second group extends along a first direction from a periphery of the substrate to a middle of the substrate, with an end of said each first conducting line on the periphery of the substrate being connected to a first chip, and the other end of said each first conducting line left floating in the middle of the substrate;
    each of the second conducting lines of the first group and the second group extends along a second direction from the periphery of the substrate to the middle of the substrate, with an end of said each second conducting line on the periphery of the substrate being connected to a second chip, and the other end of said each second conducting line left floating in the middle of the substrate;
    wherein, the first conducting line is a drive line, the second conducting line is a sense line, the first chip is a drive chip, and the second chip is a sense chip; or the first conducting line is a sense line, the second conducting line is a drive line, the first chip is a sense chip, and the second chip is a drive chip.

2. The capacitive touch panel of claim 1, wherein the first direction is perpendicular to the second direction.

3. The capacitive touch panel of claim 1, wherein the touch panel is a rectangular, and the first direction and the second direction are respectively extension directions of two adjacent edges of the touch panel.

4. The capacitive touch panel of claim 3, wherein the first region and the second region are respectively disposed on a left half and a right half of the first surface.

5. The capacitive touch panel of claim 4, wherein the first region and the second region have the same size and a same shape.

6. The capacitive touch panel of claim 5, wherein the shape is rectangular, triangular, trapezoid, or irregular.

7. The capacitive touch panel of claim 1, wherein the first surface further comprises a fifth region, and the second surface further comprises a sixth region, wherein the fifth region and the sixth region coincide in the direction perpendicular to the first surface and the second surface;
    a third group of the first conducting lines is formed in the fifth region, a third group of the second conducting lines is formed in the sixth region;
    each of the first conducting lines of the third group extends along the first direction from the periphery of the substrate to the middle of the substrate, with an end of said each first conducting line on the periphery of the substrate being connected to the first chip, and the other end of said each first conducting line left floating in the middle of the substrate;
    each of the second conducting lines of the third group extends along the second direction from the periphery of the substrate to the middle of the substrate, with an end of said each second conducting line on the periphery of the substrate being connected to the second chip, and the other end of said each second conducting line left floating in the middle of the substrate.

8. The capacitive touch panel of claim 7, wherein the capacitive touch panel comprises three first chips and three second chips, with the first conducting lines of the first, second, and third groups being respectively connected to a corresponding one of the three first chips, and the second conducting lines of the first, second, and third groups being respectively connected to a corresponding one of the three second chips.

9. The capacitive touch panel of claim 7, wherein the touch panel is a rectangular, and the first direction and the second direction are respectively the extension directions of the two adjacent edges of the touch panel.

10. The capacitive touch panel of claim 9, wherein the first region is disposed on a left half of the first surface, the second region is disposed on an upper right half of the first surface, and the fifth region is disposed on a lower right half of the first surface; or the first region is disposed on an upper left half of the first surface, the second region is disposed on a lower left half of the first surface, and the fifth region is disposed on a right half of the first surface.

11. The capacitive touch panel of claim 1, wherein the first surface of the substrate further comprises a fifth region and a sixth region, the second surface of the substrate further comprises a seventh region and an eighth region, wherein the fifth region and the eighth region coincide in a direction perpendicular to the first surface and the second surface, and the sixth region and the seventh region coincide in a direction perpendicular to the first surface and the second surface;

a third group of the first conducting lines is formed in the fifth region, a third group of the second conducting lines is formed in the sixth region, a fourth group of first conducting lines is formed in the seventh region, and a fourth group of the second conducting lines is formed in the eighth region;

each of the first conducting lines of the third group and the fourth group extends along the first direction from the periphery of the substrate to the middle of the substrate, with an end of said each first conducting line on the periphery of the substrate being connected to the first chip, and the other end of said each first conducting line left floating in the middle of the substrate;

each of the second conducting lines of the third group and the fourth group extends along the second direction from the periphery of the substrate to the middle of the substrate, with the end of said each second conducting line on the periphery of the substrate being connected to the second chip, and the other end of said each second conducting line left floating in the middle of the substrate.

12. The capacitive touch panel of claim 11, wherein the capacitive touch panel comprises four first chips and four second chips, with the first conducting lines of the first, second, third, and fourth groups being respectively connected to a corresponding one of the four first chips, and the second conducting lines of the first, second, third, and fourth groups being respectively connected to a corresponding one of the four second chips.

13. The capacitive touch panel of claim 11, wherein the touch panel is a rectangular, and the first direction and the second direction are respectively the extension directions of the two adjacent edges of the touch panel.

14. The capacitive touch panel of claim 13, wherein the first region is disposed on an upper left half of the first surface, the second region is disposed on an upper right half of the first surface, the fifth region is disposed on a lower right half of the first surface, and the sixth region is disposed on a lower left half of the first surface.

15. The capacitive touch panel of claim 11, wherein a ground wire is arranged in-between the numerous regions of the first surface and the second surface, and the ground wire is disconnected to any of the first conducting lines and the second conducting lines.

16. The capacitive touch panel of claim 15, wherein one or more ground wires are arranged on any of the first surface and the second surface, and at least one end of each ground wire extends to the periphery of the capacitive panel for grounding.

17. The capacitive touch panel of claim 16, wherein the first conducting lines, the second conducting lines and the one or more ground wires on any of the first surface or the second surface are formed in a same process.

18. The capacitive touch panel of claim 11, an additional conducting line is provided in at least one region on the first surface and the second surface of the capacitive touch panel, wherein the additional conducting line is provided on periphery of the at least one region, and is adjacent to a floating end of each of a group of conducting lines, and the additional conducting line has an end on the periphery of the substrate;

wherein if the group of conducting lines is the first group of the first conducting lines, the additional conducting line is the second conducting line, and the end of the additional conducting line, on the periphery of the substrate, is configured to be electrically connected to the second chip, if the group of conducting lines is the second group of the second conducting lines, the additional conducting line is the first conducting line, and the end of the additional conducting line, on the periphery of the substrate, is configured to be electrically connected to the first chip.

19. The capacitive touch panel of claim 18, wherein the additional conducting line has the end on the periphery of the substrate and the other end not on the periphery of the substrate, and the other end is left floating.

20. The capacitive touch panel of claim 18, wherein the additional conducting line has a plurality of bent parts, each bent part corresponds to each floating end of the group of conducting lines in the at least one region respectively, and each bend part at least partly surrounds a floating end of the corresponding conducting line.

* * * * *